(12) United States Patent
Kawahara

(10) Patent No.: US 7,123,979 B2
(45) Date of Patent: Oct. 17, 2006

(54) METHOD OF INTERCORPORATE INFORMATION-SHARING, SYSTEM, AND COMPUTER PROGRAM

(75) Inventor: Kunihiro Kawahara, Sakata (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 10/691,126

(22) Filed: Oct. 21, 2003

(65) Prior Publication Data
US 2004/0122698 A1 Jun. 24, 2004

(30) Foreign Application Priority Data
Oct. 23, 2002 (JP) .............................. 2002-308312

(51) Int. Cl.
*G06Q 90/00* (2006.01)
(52) U.S. Cl. .................... 700/109; 700/52; 702/182; 705/51
(58) Field of Classification Search ................ 700/108, 700/109, 110, 95, 97, 115, 116, 121, 52; 702/95, 702/97, 115, 116, 182, 183, 184, 185; 705/22, 705/28, 50, 51; 438/14
See application file for complete search history.

(56) References Cited

U.S. PATENT DOCUMENTS 6,539,271 B1 * 3/2003 Lech et al. ................. 700/108
6,542,830 B1 * 4/2003 Mizuno et al. ............. 700/110
6,795,742 B1 * 9/2004 Ichikawa ...................... 700/97
6,842,658 B1 * 1/2005 Izawa et al. ................ 700/121

FOREIGN PATENT DOCUMENTS

| JP | 05-074899 | 3/1993 |
|----|-----------|--------|
| JP | 05-074900 | 3/1993 |
| JP | 2002-117169 | 4/2002 |
| JP | 2003-067022 | 3/2003 |
| WO | 01/97280 | 12/2001 |

* cited by examiner

*Primary Examiner*—Leo Picard
*Assistant Examiner*—Charles Kasenge
(74) *Attorney, Agent, or Firm*—Hogan & Hartson LLP

(57) ABSTRACT

A method of intercorporate information-sharing between a product-manufacturing company and a product-inspecting company includes transmitting product quality and manufacturing number information from a product-manufacturing company's database storage device to a product-inspecting company's database storage device, inspecting a product, manufactured by the product-manufacturing company, by the product-inspecting company and storing an inspected result information of the product in the product-inspecting company's database storage device and transmitting the inspected result information from the product-inspecting company's database storage device to the product-manufacturing company's database storage device.

15 Claims, 4 Drawing Sheets

METHOD OF INTERCORPORATE INFORMATION-SHARING, SYSTEM, AND COMPUTER PROGRAM

BACKGROUND OF THE INVENTION

1. Field of the Invention

The present invention relates to a method of information-sharing, and more particularly to a method of information-sharing between a product-manufacturing company and a product-inspecting company, a system thereof, and a computer program with product-processing being outsourced, information can be shared with a contractor.

2. Description of the Related Art

Conventionally, when a semiconductor product is manufactured and provided to a client company, it is required that the quality of the product (yield) is maximally enhanced for the client company. In addition, in this environment, front-end manufacturing of the semiconductor is entrusted to an outside contractor, and in this case, disclosure of information and feedback of a probe-inspection is performed between persons in charge of an outside contractor and a client by electronic mail (an E-mail), a FAX (a facsimile), and the like. Conventionally, though information of an inspected result is transmitted to an auto handler so as to utilize it in the next inspection process, the information of an inspected result is not bi-directionally processed using a database.

However, the conventional manufacturing and inspecting process includes the following problems.

In the case where a company (factory) is not in charge of both the production process and the inspection process, and either of the processes is outsourced, data transfer between companies by a FAX or an e-mail is only available for a particular person, that is a person in charge of the operation. However, if the person in charge changes, the handover to the next person is difficult. In addition, in a case where a personnel shift in a client continually occurs, responding to this is difficult. This is the same regarding a personnel shift in an outside contractor. Namely, staff members of both a client and an outside contractor can not recognize the condition and the situation of the product at the same environmental level. Particularly, because a LOT number for the semiconductor devices changes depending on a client company, an error in the discrimination of a LOT often occur. Furthermore, recognizing the progress of LOT processing is not uniformly systematized such that there is a waste in entrusting a transport company, and the like.

In view of the above issues, the present invention is intended to provide to a method and system of information-sharing between a product-manufacturing company and a product-inspecting company, a system thereof, and a computer program. This method and system can feed information of inspected yield back so as to share it among related companies, enabling quality of processed (manufactured) products in a front-end process to be efficiently improved.

SUMMARY OF THE INVENTION

A method of intercorporate information-sharing between a product-manufacturing company and a product-inspecting company includes a first step of transmitting information of product quality and information of a manufacturing number from a memory for storing a product-manufacturing company's database to a memory for storing a product-inspecting company's database. A second step inspects a product, manufactured by the product-manufacturing company, through the product-inspecting company and stores information of an inspected result of the product in the memory for storing a product-inspecting company's database. A third step transmits the information of an inspected result from the memory for storing a product-inspecting company's database to the memory for storing a product-manufacturing company's database.

Further, a summary of the present invention may include the method of intercorporate information-sharing, wherein the first step includes a step of forming first coded information from the information of product quality and the information of a manufacturing number, a step of transmitting and storing the first coded information to and in a server in the product-inspecting company and a step of transmitting and decoding the first coded information stored in the server to and in the memory for storing a product-inspecting company's database.

Further, a summary of the present invention may include the method of intercorporate information-sharing, wherein the third step includes a step of forming second coded information from the information of a manufacturing number and the information of an inspected result, a step of transmitting and storing the second coded information to and in the server and a step of transmitting and decoding the second coded information stored in the server to and in the product-manufacturing company.

A summary of the present invention may include the method of intercorporate information-sharing, wherein the second step includes a step of calculating a yield rate from the information of an inspected result and comparing the yield rate with a prearranged yield rate and a step of predictively calculating a number of product shortage when the yield rate is lower than the prearranged yield rate. The third step includes a step of transmitting information including the number of product shortage predictively calculated.

A summary of the present invention may include a method of intercorporate information-sharing between a product-manufacturing company and a product-inspecting company including a step of issuing a manufacturing number regarding a product in the product-manufacturing company, a step of transmitting information of product quality and information of a manufacturing number from a memory for storing a product-manufacturing company's database to a memory for storing a product-inspecting company's database and a step of issuing a product number regarding the product and relating the manufacturing number with the product number in the product-inspecting company. The method also includes a step of inspecting a product, manufactured by the product-manufacturing company, through the product-inspecting company, and obtaining information of an inspected result of the product, a step of relating the information of an inspected result with the information of a manufacturing number and a step of transmitting the information of an inspected result and the information of a manufacturing number, which are related each other, from the product-inspecting company to the product-manufacturing company via a network.

Further, a summary of the present invention may include a method of intercorporate information-sharing between a plurality of product-manufacturing companies and a product-inspecting company including a step of issuing a manufacturing number regarding a product in one of the product-manufacturing companies, a step of transmitting information of product quality and information of a manufacturing number including the manufacturing number from a memory for storing a product-manufacturing company's database to a memory for storing a product-inspecting company's database and a step of recognizing one of the product-manufacturing companies, which manufactured the product, among a plurality of the product-manufacturing companies based on the manufacturing number and issuing a product number including information for recognizing one of the product-manufacturing companies, which manufactured the product, in the product-inspecting company. The method also include a step of relating the manufacturing number with the product number, a step of inspecting the product, manufactured by one of the product-manufacturing companies, through the product-inspecting company and obtaining information of an inspected result of the product, a step of relating the information of an inspected result, the product number, and the information of a manufacturing number to each other and transmitting this information to a server, a step of establishing an access right for accessing the information of an inspected result and information including the manufacturing number of the product toward one of the product-manufacturing companies which was recognized based on the product number, and a step of transmitting the information of an inspected result and the information of a manufacturing number of the product from the server to one of the product-manufacturing companies, where the access right is established, via a network.

Further, a summary of the present invention may include a system of intercorporate information-sharing between a product-manufacturing company and a product-inspecting company including a memory for storing a product-manufacturing company's database of the product-manufacturing company, relating information of product quality with information of a manufacturing number and storing this information, a memory for storing a product-inspecting company's database of the product-inspecting company, relating the information of product quality and the information of a manufacturing number with information of an inspected result and a product number regarding a product and storing this information and the product number, a server connected to a network, a transmitter for transmitting the information of product quality and the information of a manufacturing number from the memory for storing a product-manufacturing company's database to the server and a transmitter for transmitting the information of an inspected result and the information of a manufacturing number from the memory for storing a product-inspecting company's database to the server.

Further, a summary of the present invention may include a system of intercorporate information-sharing between a product-manufacturing company and a product-inspecting company including a memory for storing a product-manufacturing company's database of the product-manufacturing company, relating information of product quality regarding a product with information of a manufacturing number regarding the product and storing this information, a memory for storing a product-inspecting company's database of the product-inspecting company, relating the information of product quality and the information of a manufacturing number with information of an inspected result and a product number regarding the product and storing this information and the product number and a server connected to a network. The system also includes encoder for encoding the information of product quality and the information of a manufacturing number, which are stored in the memory for storing a product-manufacturing company's database, into first coded information, a transmitter for transmitting the first coded information from the memory for storing a product-manufacturing company's database to the server, an encoder for coding the information of an inspected result and the information of a manufacturing number, which are stored in the memory for storing a product-inspecting company's database, into second coded information and a transmitter for transmitting the second coded information from the memory for storing a product-inspecting company's database to the server.

A summary of the present invention may include a system of intercorporate information-sharing among a product-manufacturing company, a product-inspecting company, and a product-ordering company including a memory for storing a product-manufacturing company's database of the product-manufacturing company, relating information of product quality regarding a product with information of a manufacturing number regarding the product and storing this information, a memory for storing a product-inspecting company's database of the product-inspecting company, relating the information of product quality and the information of a manufacturing number with information of an inspected result and a product number regarding the product and storing this information and the product number and a server connected to a network. The system also include a transmitter for transmitting the information of product quality and the information of a manufacturing number from the memory for storing a product-manufacturing company's database to the server and a transmitter for transmitting the information of an inspected result and the information of a manufacturing number from the memory for storing a product-inspecting company's database to the server and a transmitter for transmitting the information of an inspected result and the information of a manufacturing number from the server to the memory for storing a product-manufacturing company's database. The system further includes a transmitter for transmitting the information of product quality and the information of a manufacturing number from the server to the memory for storing a product-inspecting company's database and a transmitter for transmitting at least one of the information of product quality and the information of an inspected result, and the information of a manufacturing number from the server to a memory for storing a product-ordering company's database.

Further, a summary of the present invention may include a system of processing information including a receiver that receives first coded information, into which information of a manufacturing number and information of product quality regarding a product are coded, stored in a server, a decoder that decodes the first coded information into the information of a manufacturing number and the information of product quality, a memory that stores the information of a manufacturing number and the information of product quality in a memory for storing a database and a processor that inspects the product, which was manufactured, and stores information of an inspected result of the product in the memory for storing a database. The system also includes a processor that relates the information of a manufacturing number with the information of an inspected result, an encoder that encodes the information of a manufacturing number and the information of an inspected result into second coded information and a transmitter that transmits the second coded information to the server.

Further, a summary of the present invention may include a system of processing information including a memory that stores information of a manufacturing number and information of product quality regarding a product, an encoder that encodes the information of a manufacturing number and the information of product quality into first coded information, a transmitter that transmits the first coded information to a server, a receiver that receives the first coded information from the server and a decoder that decodes second coded information, into which the information of a manufacturing number and information of an inspected result regarding the product are coded, into the information of a manufacturing number and the information of an inspected result.

Finally, a summary of the present invention may include a computer program operating any one of the elements described in the method of intercorporate information-sharing, wherein each step described in the method of intercorporate information-sharing is coded.

DETAILED DESCRIPTION OF THE PREFERRED EMBODIMENTS

An embodiment of the present invention will be described in detail hereafter referring to drawings.

Figure 1:
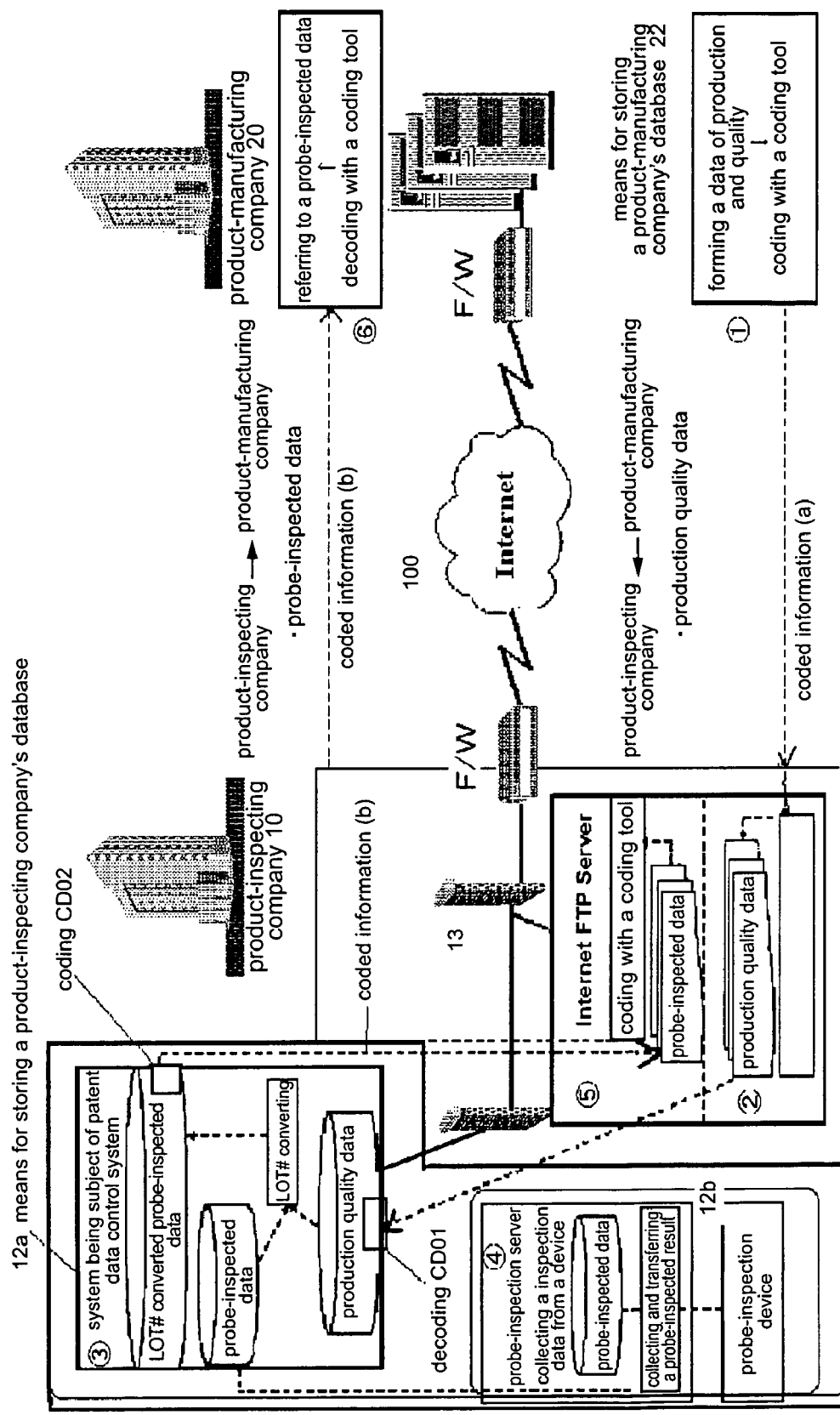
FIG. 1 is a diagram showing a schematic view of a system of information-sharing among a plurality of companies related to the embodiment of the present invention.

FIG. 1 is a diagram showing a schematic view of a system of information-sharing among a plurality of companies related to the present embodiment.

As shown in FIG. 1, the system of information-sharing among a plurality of companies related to the present embodiment roughly includes a processor for processing information 12 in a product-inspecting company (an inspecting company, a first company) 10, and a memory for storing a product-manufacturing company's database 22 including a product-manufacturing company's server group (a second server) in a product-manufacturing company (a manufacturing company, a second company) 20. These devices send and receive data via a network such as an internet 100.

The processor for processing information 12 includes a memory for storing a product-inspecting company's database (a data control system) 12a, a memory for storing an inspected result in implementing probe-inspection 12b, and a server unit (a first server) 13. Here, the memory for storing an inspected result is, for example, a server which stores a result of probe-inspection made by implementing probe-inspection 12b for a product received by a product-inspecting company from a product-manufacturing company. In addition, the server unit 13 is preferably an FTP server capable of interchanging a file with a client connected to a network.

The processor for processing information 12 and the memory for storing a product-manufacturing company's database 22 (including the server group) realize interchange of information between the product-manufacturing company 20 and the product-inspecting company 10 by utilizing the internet 100 and a WEB art. Here, the server unit 13 and the memory for storing a product-manufacturing company's database 22 may further include WEB server function and may be connected to a net terminal including a WEB browser so that data of a markup language format such as an XML used in the internet 100 can be efficiently sent and received. In addition, information stored in the server unit 13 and information which the server unit 13 sends and receives is preferably coded information in order to keep the data secret. Therefore, each of the processor for processing information 12 and the processor for storing a product-manufacturing company's database 22 preferably includes a coding unit and a decoding unit.

A product manufactured in the product-manufacturing company 20 is sent to the product-inspecting company 10. Meanwhile, information of product quality such as flow information (production information: progress and a due date of a lot; and stock) and quality information (information of production quality: quality data; and a number of defective products) regarding the product, and information of product manufacturing numbers are coded into coded information (a) (first coded information) so as to be sent from the memory for storing a product-manufacturing company's database 22 to the server unit 13 and stored therein. Here, the coded information (a) may be in a markup language format such as an XML format.

Further, the product quality information and the product manufacturing number information, which are loaded into the server unit 13, are sent to the memory for storing a product-inspecting company's database 12a as the coded information (a) via a dedicated line or the Internet so as to be decoded (CD01) and stored therein.

Here, data may be simultaneously sent to a customer and a third party, and be decoded and stored in a database, by establishing their access rights.

The product manufactured by the product-manufacturing company 20 is received by the product-inspecting company 10. The product-inspecting company 10 issues a product number and associates it with a manufacturing number issued by the product-manufacturing company 20 to store them in the memory for storing a product-inspecting company's database 12a. In addition, it is desirable that the product-manufacturing company 10 can be recognized from the manufacturing number, and the product number is a number by which the product-manufacturing company 10 can be recognized regarding the product.

Next, the product is inspected by probe-inspection and the like. The product number and information of an inspected result are stored in the memory for storing an inspected result in implementing probe-inspection 12b, then, sent to the memory for storing a product-inspecting company's database 12a so as to be stored therein. Subsequently, the inspected result information regarding the product and the manufacturing number information related to the product number are coded (CD02) into coded information (b) (second coded information) so as to be sent to the server unit 13 and stored therein.

The coded information (b) loaded into the server unit 13 is sent to the memory for storing a product-manufacturing company's database 22 via the internet 100 so as to be decoded into the manufacturing number information and the inspected result information. The manufacturing number and the inspected result decoded information are related to the product quality information and stored. Further, in the case of a plurality of product-manufacturing companies, one of the product-manufacturing companies, which manufactures a product, may be recognized based on the manufacturing number information, and an access right may be established so as to allow the company to receive the coded information (b). The coded information (b) may be also sent to a customer and a third party, and be decoded and stored in a database.

Figure 2:
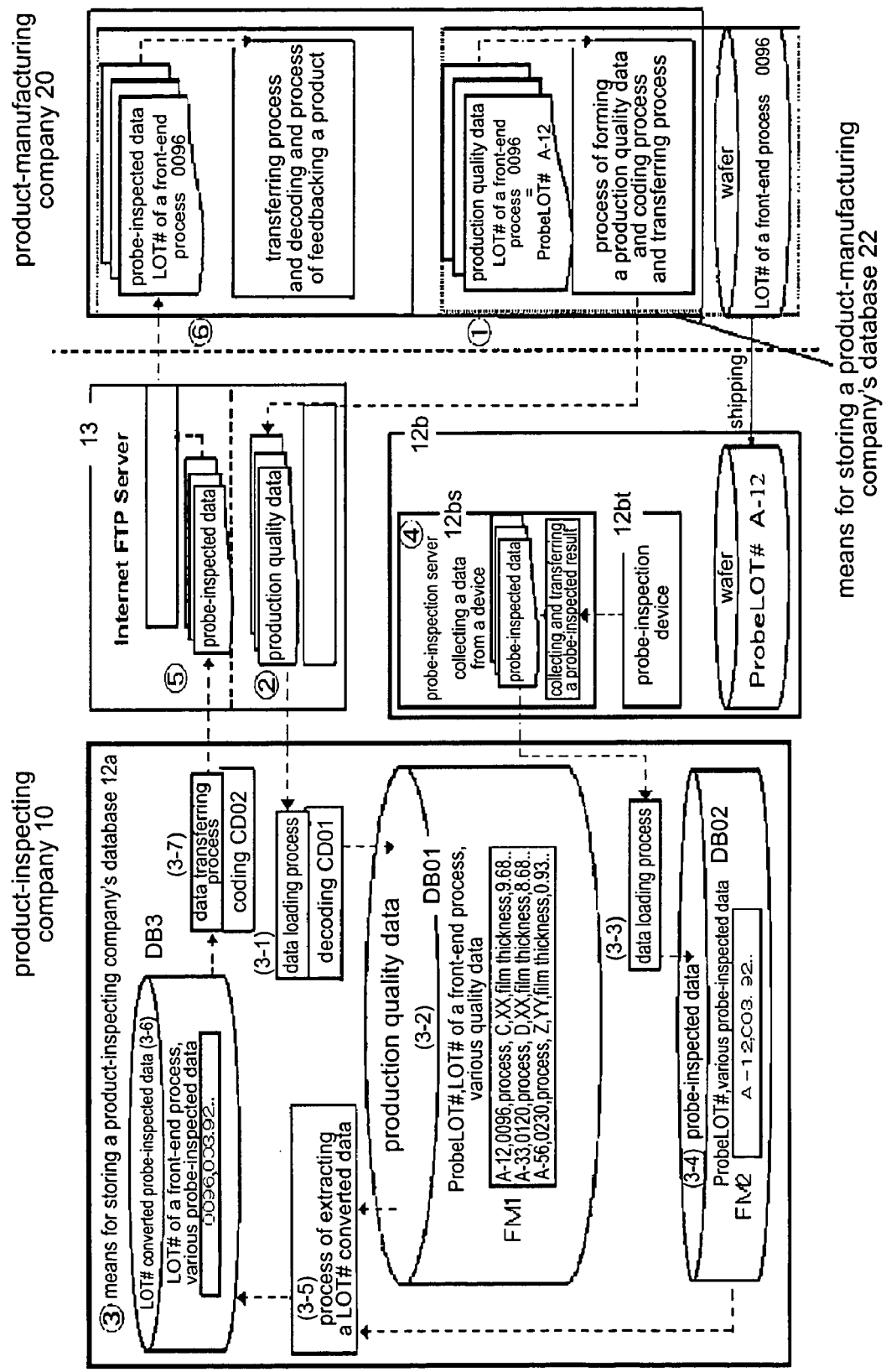
FIG. 2 is a diagram showing detail of each element and a data flow in FIG. 1.

FIG. 2 is a diagram showing detail of each element and a data flow in FIG. 1.

The data flow will be described referring to one example hereafter.

① A data file (a quality data) regarding production quality information made in a manufacturing process of a semiconductor wafer of the product-manufacturing company 20 is coded by a coding tool so as to be sent to the server unit 13 (an Internet FTP Server) of the product-inspecting company 10 via the internet 100. In FIG. 2, the product-manufacturing company 20 deals with the lot by setting a lot number thereof as LOT# (a lot number) 0096. In addition, when the wafer is shipped, it is associated with (LOT# A-12) corresponding thereto in the product-inspecting company 10, which takes over processing. As for a LOT#, "0096" and "A-12" show the same lot physically.

② The coded file sent to the server unit 13 in the product-inspecting company 10 is added in a production quality data DB01. In addition, the data file is decoded (CD01) by a decoding tool.

③ The following processes are implemented by the memory for storing a product-inspecting company's database 12*a* in the product-inspecting company 10.

(3-1) A data loading process: data (quality data) regarding production quality, which is stored in the server unit 13, is added in the production quality data DB01 in the memory for storing a product-inspecting company's database 12*a*.

(3-2) A product quality data DB01: data format FM1 is used for data flow between the product-inspecting company 10 and the product-manufacturing company 20. The quality data is related to a LOT# of the product-inspecting company 10 (for example, A-12) and a LOT# of the product-manufacturing company 20 (for example, 0096) and stored.

(3-3) A data loading process: inspected data of the LOT inspected in a section for probe-inspection 12*b* in the product-inspecting company 10 is added in a probe-inspected data DB02 in the memory for storing a product-inspecting company's database 12*a*.

(3-4) A probe-inspected data: data format FM2 is used for data flow between the product-inspecting company 10 and the product-manufacturing company 20. The data is stored with the LOT# of the product-inspecting company 10 (for example, A-12).

(3-5) A process of extracting a LOT# converted data: the probe-inspected data of the probe-inspected data DB02 is extracted, then the LOT#s of the product-inspecting company 10 and the product-manufacturing company 20 in the production quality data DB01 are applied to it so as to add it anew in a LOT# converted probe-inspected data DB03 as an LOT# converted probe-inspected data.

(3-6) A LOT# converted probe-inspected data: data format is used for data flow between the product-inspecting company 10 and the product-manufacturing company 20. The data is stored with the LOT# of the product-manufacturing company 20 (for example, 0096).

(3-7) A data loading process: the inspected data of the LOT# converted probe-inspected data DB03, which was formed in the memory for storing a product-inspecting company's database 12*a*, is stored in the server unit 13.

④ The product-inspecting company 10 receives the wafer LOT (for example, 0096: A-12) manufactured and shipped by the product-manufacturing company 20 so as to ship it to a customer as a product. In the meanwhile, the product is inspected by a probe-inspection tester (a probe-inspection device) 12*bt* to collect data by a probe-inspection server 12*bs*.

⑤ A LOT# converted probe-inspected data file in the LOT# converted probe-inspected data DB03 is stored in the server unit 13 in the product-inspecting company 10. It is sent to the product-manufacturing company 20.

⑥ In the product-manufacturing company 20, the coded LOT# converted probe-inspected data file received from the product-inspecting company 10 is decoded by a decoding tool, while the yield (a yield rate) of the wafer LOT manufactured by the product-manufacturing company 20 is reviewed so as to be fed back for a future action of semiconductor manufacturing to improve quality.

Here, in the present embodiment, having a client company equipped (a third company, not shown in the drawing) with a data-sharing unit equivalent to the server unit 13 of FIG. 1 can form a system, where the third company can ask the product-inspecting company 10 and the product-manufacturing company 20 to deal with each process. In addition, the third company sends a processing standard meeting its need from a third server unit (not shown in the drawing) to the server unit 13 of FIG. 1. Then, the product-manufacturing company 20 manufactures (processes) a product based on the processing standard, while the product-inspecting company 10 makes an inspected data according to the processing standard, thereby information-sharing is progressed.

Further, in a case where probe-inspection based on the processing standard shows that prearranged yield (a prearranged yield rate) is not achieved, and that a number of product shortage is predicted within a scope of a requirement contract, information of the number of product shortages can be sent to a second server 22 in the product-manufacturing company 20, thereby an increase in production can be promoted. Furthermore, as the inspection standard of the probe-inspection changes based on a direction from the client company so that the yield improves, and the like, a variable factor (a parameter) can change within a requirement contract, thereby a request of the client company can be accepted in detail.

Further, the product-inspecting company 10 of the present embodiment being its own company, the system can be managed with the product-manufacturing company 20 regarded as an outsourcing company (factory).

In addition, the client company being own company (a main company), the system can be managed with the product-inspecting company 10 and the product-manufacturing company 20 regarded as outsourcing companies.

A product data (a production control data) including flow information (flow data) further includes P/O (Purchase Order) data (P.O#, order data, a type, a lot, a number, and a due date), WIP (Wafer In Process) data (a type, a lot, a number, a process in progress, and a due date), and defect and split data (a type, a lot, a process of outbreak, a number, and a cause). In addition, process data (a lot, a process, a number, a start time, a finish time) and the like can also be included.

Quality data (quality control data) includes process data (a type, a lot, a number, wafer ID, a process in progress, a measurement item, and a measured value), E-TEST data (a type, a lot, a number, wafer ID, a process in progress, a measurement item, and a measured value), and EDP data (probe-inspection).

Figure 3:
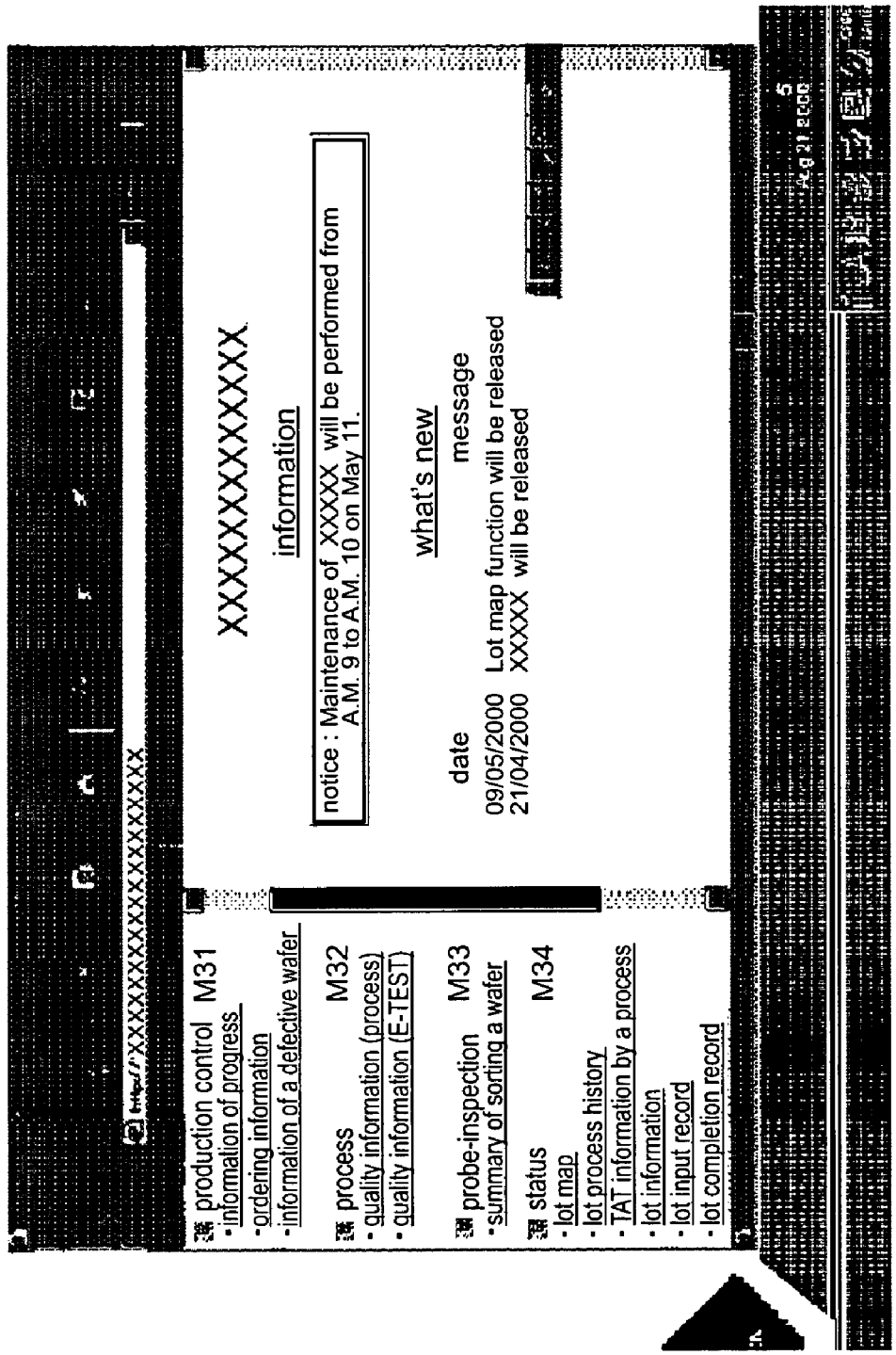
FIG. 3 is a diagram showing one example of a WEB screen used by companies of FIG. 1.

FIG. 3 is a diagram showing one example of a WEB screen used by companies of FIG. 1.

A WEB server is equipped with the first server 13 of FIG. 1, while a net terminal including a WEB browser is equipped with the second company 20 and the third company group, thereby data utilizing an XML format can be easily shared (browsed, disclosed).

Equipping a WEB server function with each of the first server 13, the second server 22, and a third server unit enables data transfer among them using a markup language such as an XML.

As shown in FIG. 3, a menu, such as progress information, order information, production control M31 including defective wafer information, quality information (a process), a process including quality information (E-TEST), probe-inspection M33, lot information, status M34 including lot input record, is selected.

Figure 4:
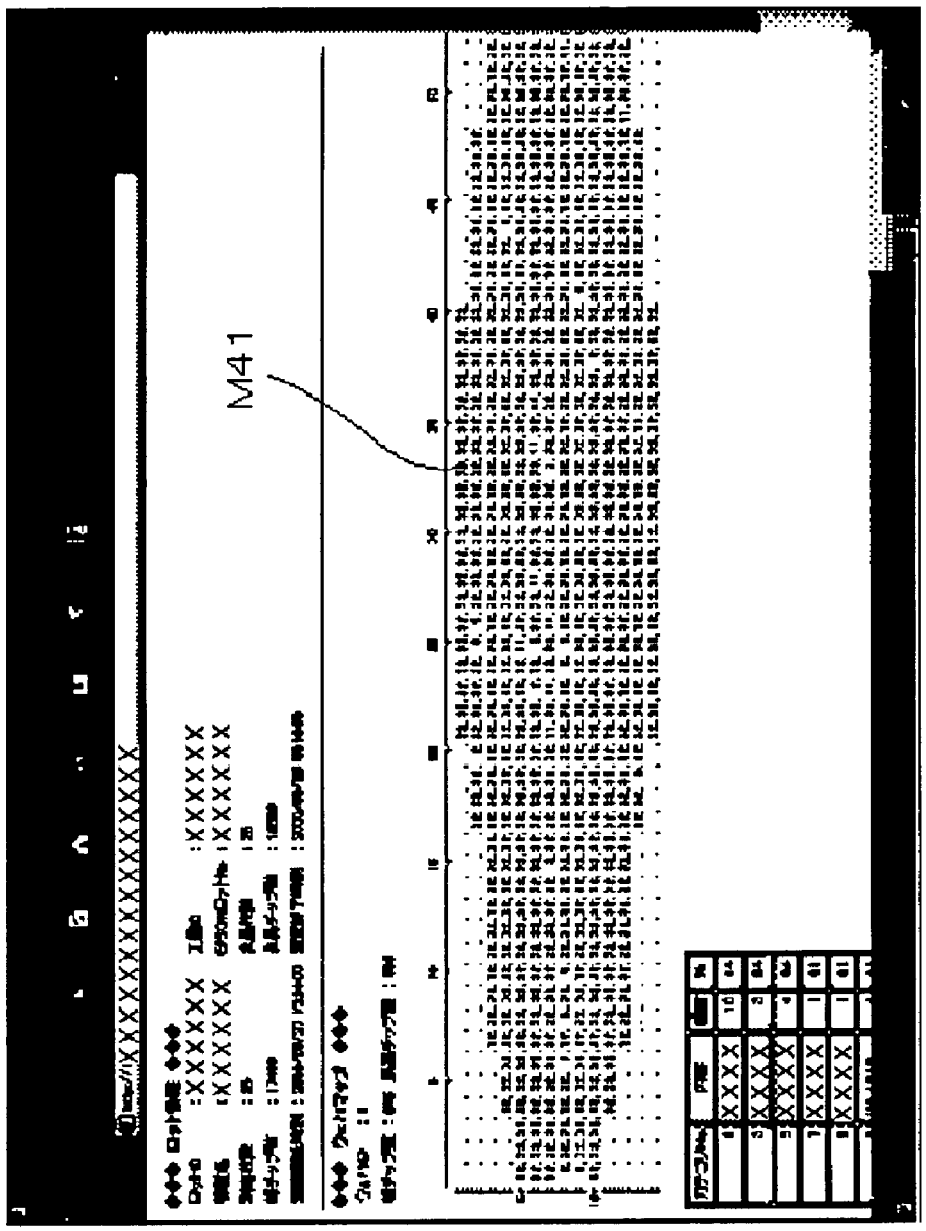
FIG. 4 is a diagram showing one example of a data display screen used by companies of FIG. 1.

FIG. 4 is a diagram showing one example of a data display screen used by companies of FIG. 1.

As shown in FIG. 4, a wafer map data M41 can also be easily sent and received utilizing XML format. In addition, a total chip number, a good chip number, a coordinate, a category, and the like can also be processed as XML data.

Here, in the present embodiment, a network drive can also be utilized as a shared directory. This network drive is an external storage device on a server, which can be used via a network. A client using a network function can utilize various resources of a server disclosed on a network. According to this function, an external storage device disclosed on a network by a server is referred to as a network drive. Though, in most cases, a network drive is usually a hard disk being readable and writable for a client, there is a case where a read only device such as a CD-ROM and a storage device (looks like an external storage device from a client), which a server virtually builds by software, may become a network drive.

As described, a network drive is not necessarily a physical device such that a network disc, which a client can use, is generally referred to as a shared directory.

Further, a "database" described in the present embodiment is an accumulation of any information exhaustively collected, or information being collected in line with such object. This has a structure for certainly processing addition, deletion, update, and search of information at high speed and is controlled by software for controlling a database. In addition, a "markup language" is a language format for applying a tag to a document so as to add document structure and information of modification thereto. For example, a tag such as <TITLE> is applied to a document so as to show it is a heading. A characteristic of a document using a markup language is that data thereof is absolutely a text such that it can be operated on with a usual text editor, of course, while it can be operated on using various pieces of text-converting software and the like, many of which are developed by UNIX (registered trademark) environment and the like. Typical markup languages include an SGML, an HTML, an XML, and the like.

Here, though transferring (disclosing, browsing) of data of an XML format is described in the present embodiment basically, a simultaneous use with a data transfer using a normal FTP or data transfer system utilizing a virtual machine (MVS) can also be available.

Further, in the present embodiment, the present invention is not limited thereto but applied to a method of information-sharing between a product-manufacturing company and a product-inspecting company, a system thereof, and a computer program, which are suitable for applying the present invention.

In addition, a number, a position, a form, and the like of the element are not limited to the above embodiment but modified suitably for implementing the present invention.

Here, the same element has the same reference numeral in each diagram.

The present invention is constituted as the above so as to have following effects.

Information such as quality data and inspected data can be shared by a client (a company for probe-inspection) and a product-manufacturing company (a company for front-end manufacturing), thereby production efficiency is improved. As a result, the client quickly and correctly recognizes the quality of a wafer manufactured by the company for front-end manufacturing such that improving quick quality feedback in the manufacturing process is possible. The company for front-end manufacturing can deal with a result of probe-inspection, of which a LOT# is converted into one used in a front-end process such that a lot is efficiently processed. In addition, feedback to a wafer manufacturing process of the front-end is easy such that production efficiency can be improved.

Further, flows (production condition) in a number of the companies for front-end manufacturing can be recognized, thereby a distribution method (a transport company) is easily selected so as to reduce cost. The company for probe-inspection can respond to a number of companies for front-end manufacturing, and apply their own LOT# and use their own LOT# for LOT control.

Furthermore, product data including inspected data, quality data, and flow data is transferred (disclosed) to a server in the client company (a product-ordering company), which is a final receiver of a product, thereby an appropriate direction (such as a change in standard setting) from the client, which responds to a decline in the yield and a delay in production, can be received.

In addition, even in a case where both the company for front-end manufacturing and the company for probe-inspection are managed as outsourcing factories, secrecy of transferred data can be easily established by utilizing an internet, a markup language such as an XML used in the Internet, and a coding and decoding art.

Further, even in a case where a company (the company for probe-inspection and the client company) other than a company shipping a lot takes charge of transporting a product, it can recognize flow data (production condition) so as to be capable of efficiently arranging a transport company.

What is claimed is:

1. A method of intercorporate information-sharing between a product-manufacturing company and a product-inspecting company comprising:

transmitting product quality and manufacturing number information front a product-manufacturing company's database storage device to a product-inspecting company's database storage device;

inspecting a product, manufactured by the product-manufacturing company, by the product-inspecting company, including calculating a yield rate from inspected result information and comparing the yield rate with a prearranged yield rate, and predictively calculating a product shortage number when the yield rate is lower than the prearranged yield rate, and storing the inspected result in-formation of the product in the product-inspecting company's database storage device; and transmitting the inspected result information, including the predictively calculated product shortage number, from the product-inspecting company's database storage device to the product-manufacturing company's database storage device.

2. The method of intercorporate information-sharing according to claim 1, wherein the transmitting product quality and manufacturing number information step includes:

forming List coded information from the product quality and the manufacturing number information;

transmitting and storing the first coded information to and in a server in the product-inspecting company; and transmitting and decoding the first coded information stored in the server to and in the product-inspecting company's database storage device.

3. The method of intercorporate information-sharing according to claim 2, wherein the transmitting the inspected result information step includes:
forming second coded information from the manufacturing number and the inspected result information;
transmitting and storing the second coded information to and in the server; and
transmitting and decoding the second coded information stored in the server to and in the product-manufacturing company's database storage device.

4. A method of intercorporate information-sharing between a product-manufacturing company and a product-inspecting company comprising:
issuing a manufacturing number regarding a product in the product-manufacturing company;
transmitting product quality and manufacturing number information from a product-manufacturing company's database storage device to a product-inspecting company's database storage device;
recognizing the product-manufacturing company based on the manufacturing number information;
issuing a product number regarding the product and relating the manufacturing number with the product number in the product-inspecting company;
inspecting a product, manufactured by the product-manufacturing company, by the product-inspecting company, and obtaining inspected result information of the product;
relating the inspected result information with the manufacturing number information;
establishing an access right to the recognized product manufacturing company; and
transmitting the inspected result information and the manufacturing number information from the product-inspecting company to the product-manufacturing company, where the access right has been established, via a network.

5. A method of intercorporate information-sharing between a plurality of product-manufacturing companies and a product-inspecting company comprising:
issuing a manufacturing number regarding a product in one of the product-manufacturing companies;
transmitting product quality and manufacturing number information including the manufacturing number from a product-manufacturing company's database storage device to a product-inspecting company's database storage device;
recognizing one of the product-manufacturing companies, which manufactured the product, among a plurality of the product-manufacturing companies based on the manufacturing number and issuing a product number including information for recognizing one of the product-manufacturing companies, which manufactured the product, in the product-inspecting company;
relating the manufacturing number with the product number; inspecting the product, manufactured by one of the product-manufacturing companies, by the product-inspecting company and obtaining inspected result information of the product;
relating the inspected result information, the product number, and the manufacturing number information to each other and transmitting the information to a server;
establishing an access right for accessing the inspected result information and information including the manufacturing number of the product to one of the product-manufacturing companies recognized based on the product number; and
transmitting the inspected result information and the manufacturing number information of the product from the server to one of the product-manufacturing companies, where the access right has been established, via a network.

6. A system of intercorporate information-sharing between a product-manufacturing company and a product-inspecting company comprising:
a storage device that stores a product-manufacturing company's database, relating product quality information with manufacturing number information;
a storage device that stores a product-inspecting company's database, relating product quality information and the manufacturing number information with inspected result information and a product number regarding a product and storing this information and the product number, and that stores an access right that is established if the product-manufacturing company is recognized based on the manufacturing number information;
a server connected to a network;
a transmitter that transmits the product quality and the manufacturing number information from a storage device that stores the product-manufacturing company's database to the server; and
a transmitter that transmits the inspected result information and the manufacturing number information from the storage device that stores the product-inspecting company's database to the server, wherein the product-manufacturing company is allowed to receive the inspected result information if the access right has been established.

7. A system of intercorporate information-sharing between a product-manufacturing company and a product-inspecting company comprising:
a storage device that stores a product-manufacturing company's database, relating product quality information regarding a product with manufacturing number information regarding the product and storing this information;
a storage device that stores a product-inspecting company's database, relating the product quality information and the manufacturing number information with inspected result information and a product number regarding the product and storing this information and the product number, and that stores a predictively calculated product shortage number based on a comparison between a yield rate from the inspected result information and a prearranged yield rate;
a server connected to a network;
an encoder that encodes the product quality information and the manufacturing number information, which are stored in the storage device that stores the product-manufacturing company's database, as first coded information;
a transmitter that transmits the first coded information from the storage device that stores the product-manufacturing company's database to the server;
an encoder that encodes the inspected result information, the predictively calculated product shortage number and the manufacturing number information, which are stared in the storage device that stores the product-inspecting company's database, as second coded information; and a transmitter that transmits the second coded information from the storage device that stores a product-inspecting company's database to the server.

8. A system of intercorporate information-sharing among a product-manufacturing company, a product-inspecting company, and a product-ordering company comprising:
   a storage device that stores a product-manufacturing company's database, relating product quality information regarding a product with manufacturing number information regarding the product and storing this information;
   a storage device that stores a product-inspecting company's database, relating the product quality information and the manufacturing number information with inspected result information and a product number regarding the product and storing this information and the product number, and that stores an access right that is established if the product-manufacturing company is recognized based on the manufacturing number information;
   a server connected to a network;
   a transmitter that transmits the product quality information and the manufacturing number information from the storage device that stores the product-manufacturing company's database to the server;
   a transmitter that transmits the inspected result information and the manufacturing number information from the storage device that stores the product-inspecting company's database to the server;
   a transmitter that transmits the inspected result information and the manufacturing number information from the server to the storage device that stores the product-manufacturing company's database when the access right has been established;
   a transmitter that transmits the product quality information and the manufacturing number information from the server to the storage device that stores the product-inspecting company's database; and
   a transmitter that transmits at least one of the product quality and the inspected result information, and the manufacturing number information from the sewer to a storage device that stores a product-ordering company's database.

9. A method of processing information comprising:
   receiving first coded information, into which manufacturing number and product quality information regarding a product are coded and stored in a server;
   decoding the first coded information into the manufacturing number information and the product quality information;
   recognizing the product-manufacturing company based on the manufacturing number information and establishing an access right allowing the product-manufacturing company to receive second coded information;
   storing the manufacturing number information and the product quality information in a storage device that stores a database;
   inspecting the product, which was manufactured and storing inspected result information of the product in the storage device that stores a database;
   relating the manufacturing number information with the inspected result information;
   coding the manufacturing number information and the inspected result information into second coded information; and
   transmitting the second coded information to the server when the access right has been established.

10. A method of processing information comprising:
    storing manufacturing number information and product quality information regarding a product;
    coding the manufacturing number information and the product quality information into first coded information;
    transmitting the first coded information to a server;
    receiving the first coded information from the server; end
    coding the manufacturing number information and inspected result information regarding the product into second coded information;
    decoding the second coded information into the manufacturing number information and the inspected result information; and
    predictively calculating product shortage number based on a comparison between a yield rate from the inspected result information and a prearranged yield rate.

11. A computer program operating anyone of the elements described in the method of intercorporate information-sharing as claimed in claim 1, wherein each step described in claim 1 is coded.

12. A method of intercorporate information-sharing between a product-manufacturing company and a product-inspecting company comprising:
    transmitting product quality and manufacturing number information from a means for staring a product-manufacturing company's database to a means for storing a product-inspecting company's database;
    inspecting a product, manufactured by the product-manufacturing company, by the product-inspecting company, including calculating a yield rate from the inspected result information and comparing the yield rate with a prearranged yield rate, and predictively calculating a product shortage number when the yield rate is lower than the prearranged yield rate, and storing the inspected result information of the product in the means for storing a product-inspecting company's database; and
    transmitting the inspected result information, including the predictively calculated product shortage number, from the means for storing a product-inspecting company's database to the means for storing a product-manufacturing company's database.

13. The method of intercorporate information-sharing according to claim 12, wherein the transmitting product quality and manufacturing number information step includes:
    forming first coded information from the product quality and manufacturing number information;
    transmitting and storing the first coded information to and in a server in the product-inspecting company; and
    transmitting and decoding the first coded information stored in the server to and in the product-inspecting company's database.

14. The method of intercorporate information-sharing according to claim 13, wherein the transmitting the inspected result information step includes:
    forming second coded information from the manufacturing number and inspected result information;
    transmitting and storing the second coded information to and in the server; and
    transmitting and decoding the second coded information stored in the server to and in the product-manufacturing company.

15. A system of intercorporate information-sharing between a product-manufacturing company and a product-inspecting company comprising:
- a means for storing a product-manufacturing company's database, relating product quality information with manufacturing number information;
- a means for storing a product-inspecting company's database, relating product quality information and the manufacturing number information with inspected result information and a product number regarding a product and storing this information and the product number, and that stores an access right that is established if the product-manufacturing company is recognized based on the manufacturing number information;
- a server connected to a network;
- a means for transmitting the product quality and the manufacturing number information from the means for storing a product-manufacturing company's database to the server; and
- a means for transmitting the inspected result and the manufacturing number information from the means for storing a product-inspecting company's database to the server, wherein the product-manufacturing company is allowed to receive the inspected result information if the access right has been established.

* * * * *